United States Patent [19]
Holzer, Jr. et al.

[11] Patent Number: 6,010,092
[45] Date of Patent: Jan. 4, 2000

[54] OFF-WINDING YARN BY MAGNETIC LEVITATION

[75] Inventors: Carl R. Holzer, Jr., Anderson; Richard T. Phelps, III, Greenville, both of S.C.; David L. Caldwell, Weaverville, N.C.; Gary W. Hanwell, Anderson, S.C.; Theodore G. Karageorgiou, Arden, N.C.

[73] Assignee: BASF Corporation, Mt. Olive, N.J.

[21] Appl. No.: 09/187,896

[22] Filed: Nov. 6, 1998

[51] Int. Cl.[7] .............................. B65H 16/06; B65H 49/00
[52] U.S. Cl. ........................ 242/599.3; 242/550; 242/128; 310/90.5
[58] Field of Search ..................... 242/550, 598, 242/599.3, 128, 129.62; 384/446; 310/90.5

[56] References Cited

U.S. PATENT DOCUMENTS

| | | | |
|---|---|---|---|
| 2,285,667 | 6/1942 | Kontz, Jr. ................................. | 242/128 |
| 3,746,407 | 7/1973 | Stiles et al. .......................... | 384/446 X |
| 4,293,137 | 10/1981 | Ezekiel ................................. | 384/446 X |
| 4,650,132 | 3/1987 | Graf et al. .......................... | 310/90.5 X |
| 4,917,326 | 4/1990 | Kojima et al. .......................... | 242/128 |
| 4,921,186 | 5/1990 | Plasky ................................. | 242/128 X |
| 5,069,395 | 12/1991 | Krumm ................................. | 242/128 X |
| 5,096,133 | 3/1992 | Horak et al. ........................ | 384/446 X |
| 5,098,203 | 3/1992 | Henderson .......................... | 384/446 X |
| 5,197,270 | 3/1993 | Stahlecker .......................... | 310/90.5 X |
| 5,385,007 | 1/1995 | Hartel et al. ........................ | 310/90.5 X |
| 5,440,184 | 8/1995 | Samy et al. ........................ | 384/446 X |
| 5,509,621 | 4/1996 | Millett ................................. | 242/128 X |
| 5,645,355 | 7/1997 | Tokushima et al. ................. | 384/446 X |
| 5,665,293 | 9/1997 | Karageorgiou et al. ................. | 264/103 |
| 5,704,613 | 1/1998 | Holtkamp ............................ | 384/446 X |
| 5,763,972 | 6/1998 | Bernus et al. ....................... | 384/446 X |

*Primary Examiner*—Donald P. Walsh
*Assistant Examiner*—Collin A. Webb

[57] ABSTRACT

Materials are off-wound from a package by magnetically levitating the package about a centerline, such that the package remains relatively free from rotation; and removing the material from the package in a direction that is approximately parallel to the centerline.

6 Claims, 5 Drawing Sheets

OFF-WINDING YARN BY MAGNETIC LEVITATION

FIELD OF THE INVENTION

The present invention relates generally to the field of off-winding assemblies and methods for off-winding. In a specific form, the present invention is embodied in off-winding assemblies and methods for off-winding individual yarn ends from a multiple end yarn package.

BACKGROUND OF THE INVENTION

For ease of understanding and simplicity in explanation, the present invention will be described using primarily the production of synthetic filaments. This use of synthetic filament production is not intended to limit the invention to this field. It is believed that the present invention may be applied to any operation that involves off-winding, especially those operations where speed and efficiency are advantageous.

Synthetic filaments are traditionally produced by various spinning techniques. For example, synthetic filaments may be melt-spun by extruding a melt-spinnable polymer through relatively small-sized orifices in a spin pack to form streams of filaments that are substantially immediately solidified in a quench cabinet. The filaments are thereafter continuously taken up by a high-speed winder to form a generally cylindrical package. Depending on the intended end use, the filaments may be flat (undrawn) or may be subjected to a drawing step prior to being taken up to form the package.

Typically, a plurality of filaments will form a yarn end associated with each threadline. The yarn ends of each threadline are subsequently wound by a high-speed winder to form respective yarn packages. Common take-up methods guide each yarn end through a respective traversing arm associated with the high-speed winder. The traversing arm reciprocates at a relatively high speed linearly parallel to the longitudinal axis of a rotating yarn package core. As a result, the traversing arm causes the yarn end guided thereby to be wound in alternating layers of reverse helical directions about the core as the yarn package is "built" (i.e., as the radial dimension of the yarn package increases due to the yarn end wound thereabout in alternating reverse helical layers).

It was the conventional wisdom in this art that, as a practical matter, only a single yarn end could be wound around the yarn package core. This was because it was believed that the traversing arm would cause commingling to occur between the multiple yarn ends. Such yarn end commingling would prevent the later separation of the individual yarns from the yarn package and their individual use during downstream processing (e.g., as might be needed for a beam warping operation).

However, according to U.S. Pat. No. 5,665,293 (the entire content of which is expressly incorporated herein by reference), there are provided a novel yarn package and method of forming the same, wherein multiple yarn ends are wound into a generally cylindrical yarn package without commingling occurring between the individual yarn ends. The multiple yarn ends may thus be separated easily from one another during off-winding.

Now, the off-winding of such multiple yarn end packages presents several technical challenges. For example, the multiple yarn ends cannot simply be pulled from the end of the yarn package (as is customary during creeling operations of single yarn end packages) because the yarn ends would become twisted around one another, preventing their separation. Thus, off-winding assemblies and methods are needed that are especially adapted to off-wind yarn packages formed of multiple yarn ends to ensure that the yarn ends are efficiently separated from one another during off-winding operations. It is toward providing such off-winding assemblies and methods that the present invention is directed.

In conventional off-winding processes, regardless of the number of ends being off-wound, the package rotates from the motive force provided by off-winding (or is mechanically driven (rotated)) and requires braking of the package support. Thus, if the re-winder (which provides the motive force) stops, the package must also stop. Failure to mechanically brake the movement of the package results in waste, either of thread that is unwound and tangled or labor to untangle the unwound thread. Typically, this thread cannot be saved because the consistency of the rewinding process is lost in such cases and, if the stoppage occurs in the middle of rewinding, even the rewound product could be lost. The need for actuated mechanical braking of the package limits the capabilities, e.g., speed, of the off-winding process. For example, the higher the speed, the greater the braking action required to stop the package.

U.S. Pat. No. 2,285,667, to Kontz, Jr. describes off-winding two threadlines from a single package by routing one threadline through the center of the package and the other threadline off through the traveler and a guide. Such processes are limited to relatively low (less than about 200 meters/min.) backwinding speed because the friction on the guides that direct the threadline through the center can break the threadline.

SUMMARY OF THE INVENTION

Accordingly, it is an object of the present invention to provide a method for removing threadlines from packages at relatively high speeds without causing undue breakage of the threadline.

A further object of the present invention is to provide a method for removing more than one threadline from a single package at relatively high speeds.

A still further object of the present invention is to provide a method for removing threadlines from packages without the need to rotate or brake the package.

It is also an object of the present invention to provide an apparatus for removing threadlines from packages at relatively high speeds without causing undue breakage of the threadline.

Yet a further object of the present invention is to provide an apparatus for removing more than one threadline from a single package at relatively high speeds.

Another object of the present invention is to provide an apparatus for removing threadlines from packages without the need to rotate or brake the package.

In the present invention, these and other objects are addressed in a process for off-winding wound materials from a package by utilizing the steps of magnetically levitating the package about a centerline, such that the package remains relatively free from rotation; and removing the material from the package in a direction that is approximately parallel to the centerline.

In another aspect, the present invention includes an apparatus for supporting materials to be off-wound. The apparatus includes a support member for receiving the material to be off-wound, two radial magnetic actuators disposed—one near either end of the support member, a central orifice formed in each radial magnetic actuator for receiving an end of the support member. The orifice in the radial magnetic actuator has a circumference that is greater than the circumference of the support member, thus, forming a gap between the support member and each radial magnetic actuator due to this difference between the circumference of the support member and the circumference of a radial magnetic actuator. When a sufficient current is applied to the radial magnetic actuators, the support member is levitated within the gap.

Related objects and advantages will become apparent to those of ordinary skill in this art after reading the following detailed description of the preferred embodiments of the invention.

BRIEF DESCRIPTION OF THE DRAWINGS

FIG. 4a is a cross-sectional view of the magnetic actuator shown in FIG. 4 and taken along line 4a–4a.

DETAILED DESCRIPTION OF PREFERRED EMBODIMENTS

The present invention will now be described with reference to the figures and specific language will be used to describe its features. The use of specific language is not intended to limit the scope of the invention or the equivalents embodied thereby.

As used in this application, the term "package" refers to a pre-assembled unit of material to be unwound or transferred. Exemplary packages are yarn packages which can be in a variety of conventional forms, e.g., cheeses, cones, etc.

Furthermore, the present invention will be described below in the context of a multiple yarn end package having a pair of individually separable yarn ends. Such a description is for ease of discussion only with reference to the preferred embodiments of this invention. It will be understood, therefore, that the invention is not meant to be limited to off-winding assemblies and methods that serve to off-wind only a pair of yarn ends from a single multiple yarn package. Instead, the present invention may be employed to off-wind more than two yarn ends wound onto a single multiple yarn package.

However, if more than two yarn ends are present on the package, it will be appreciated that the present invention is capable of directing such multiple yarn ends only along two mutually independent threadlines. Thus, if more than two individual yarn ends are separated from a single multiple yarn package, at least one of the threadlines will be comprised of a twisted ply of at least two yarn ends which may be desirable for some end use applications. For example, if three yarn ends are off-wound from a single yarn package using the present invention, then one of the threadlines will be comprised of a twisted pair of such yarn ends while the other threadline will be comprised of a single such yarn end. Similarly, if four yarn ends are off-wound from a single yarn package, each of the threadlines may be comprised of a twisted pair of yarn ends or, one of the threadlines may be comprised of a twisted triplet of yarn ends while the other threadline is comprised of a single yarn end. Thus, those skilled in the art will understand that the disclosed embodiments may be modified so as to off-wind more than two yarn ends from a single multiple yarn package as may be desired without the need for undue experimentation.

Figure 1:
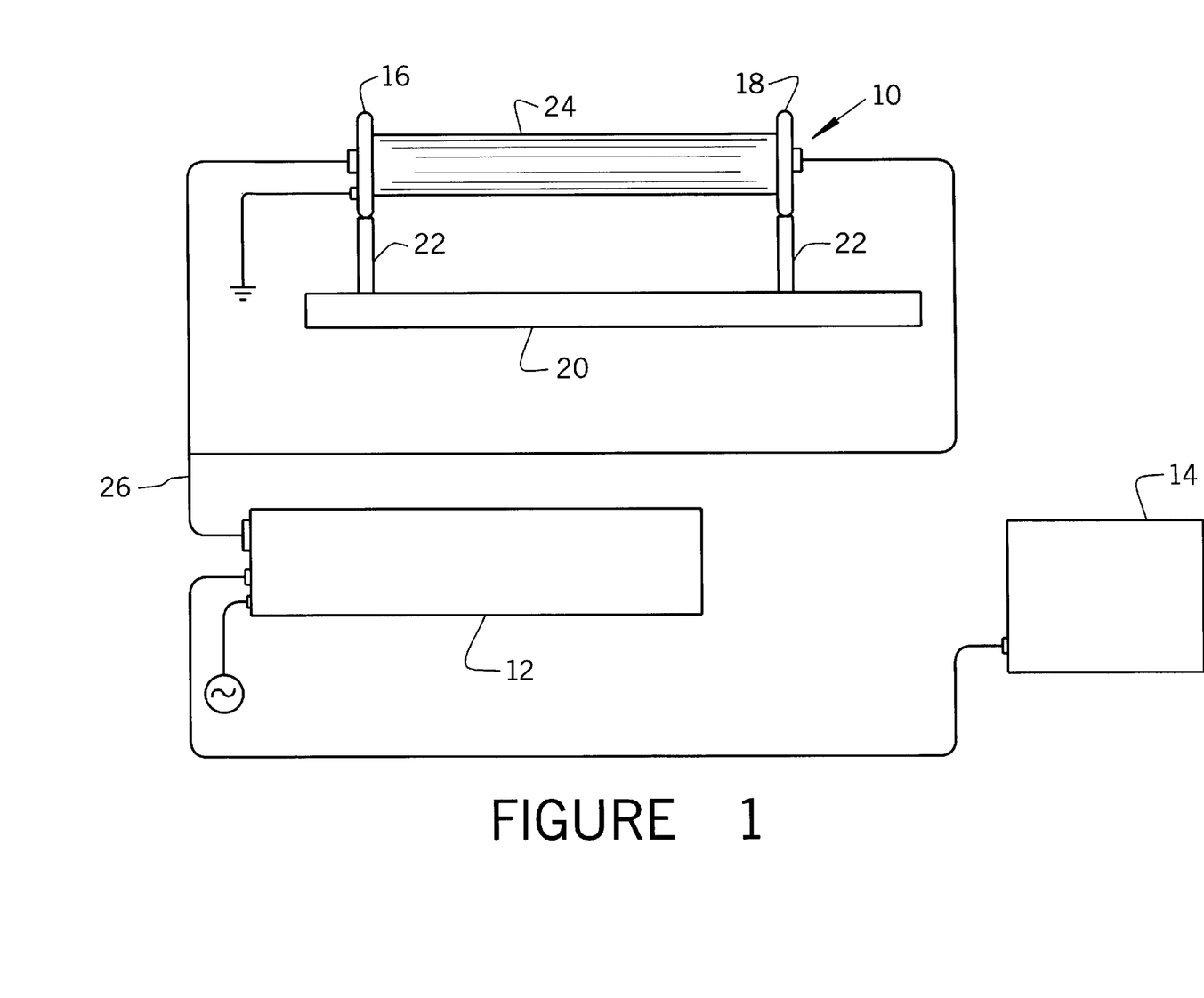
FIG. 1 is a block diagram of an apparatus of the present invention.

A first aspect of the present invention is an apparatus for supporting materials to be off-wound (preferably threadlines). This apparatus is illustrated by reference to the figures in detail. FIG. 1 is a block diagram of the component parts of a magnetic levitation system according to the present invention. The magnetic levitation system includes support assembly 10, controller 12 and optional computer interface 14.

Support assembly 10 includes two bearing actuators 16, 18 mounted to base 20 by bracket members 22. Disposed between bearing actuators 16, 18 is mandrel 24. The relative disposition of mandrel 24 and bearing actuators 16, 18 is shown in more detail in FIGS. 4 and 4a. Bearing actuators 16, 18 are electrically connected to controller 12 by connecting wires 26.

Figure 2:
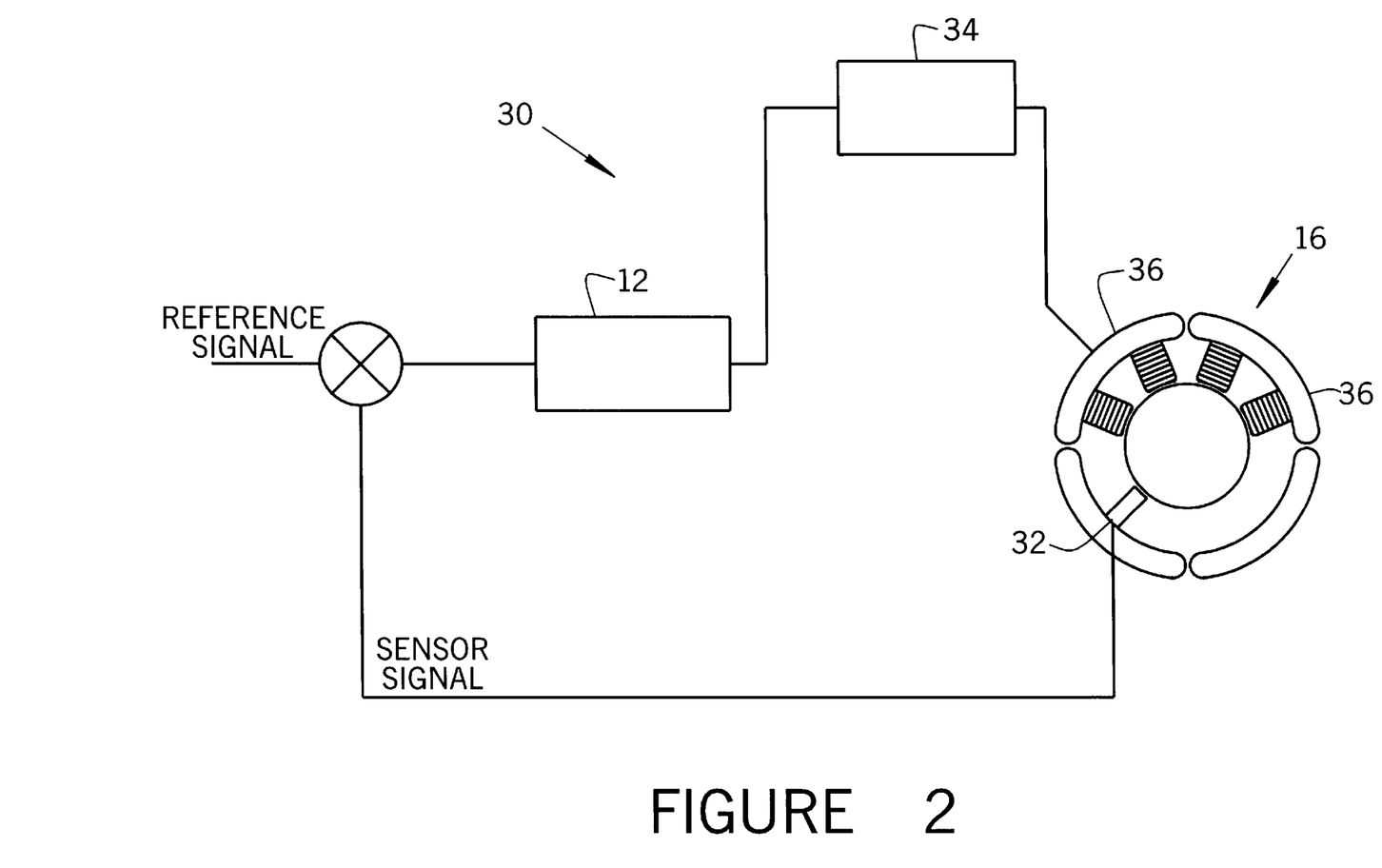
FIG. 2 is a schematic diagram of a magnetic bearing (or actuator) system.

Referring to FIGS. 1 and 2, a magnetic bearing system typically includes bearing actuators 16, 18, one or more sensors 32, controller 12 and power amplifier 34. Bearing actuators 16, 18 and sensor 32 are located in proximity to support assembly 10 (FIG. 1), while controller 12 and amplifier 34 (FIG. 2) are generally (but not necessarily) located remotely and connected to the actuators and sensor by connectors 26. Power amplifier 34 may be supplied as a component part of controller 12.

Because an electromagnet attracts ferromagnetic material, mandrel 24 can be supported in a magnetic field generated by an electric current in stators 36 of bearing actuator 16. Stator 36 will attract mandrel 24 until the two make contact unless some control is provided to modulate the magnetic field. The preferred method of control involves feedback of the mandrel's position relative to the stator. Thus, controller 12 uses position information supplied by sensor 32 to adjust the magnetic field generated in each stator 36. The strength of the magnetic field is adjusted by current flow to each stator 36 as provided by power amplifier 34. By balancing the magnetic field strength generated by each stator 36 with the position of the mandrel relative to the sensor, levitation of the mandrel can be maintained, even under changing load conditions such as, for example, lightening of the load during off-winding. Suitable position sensors include variable reluctance sensors.

Figure 3:
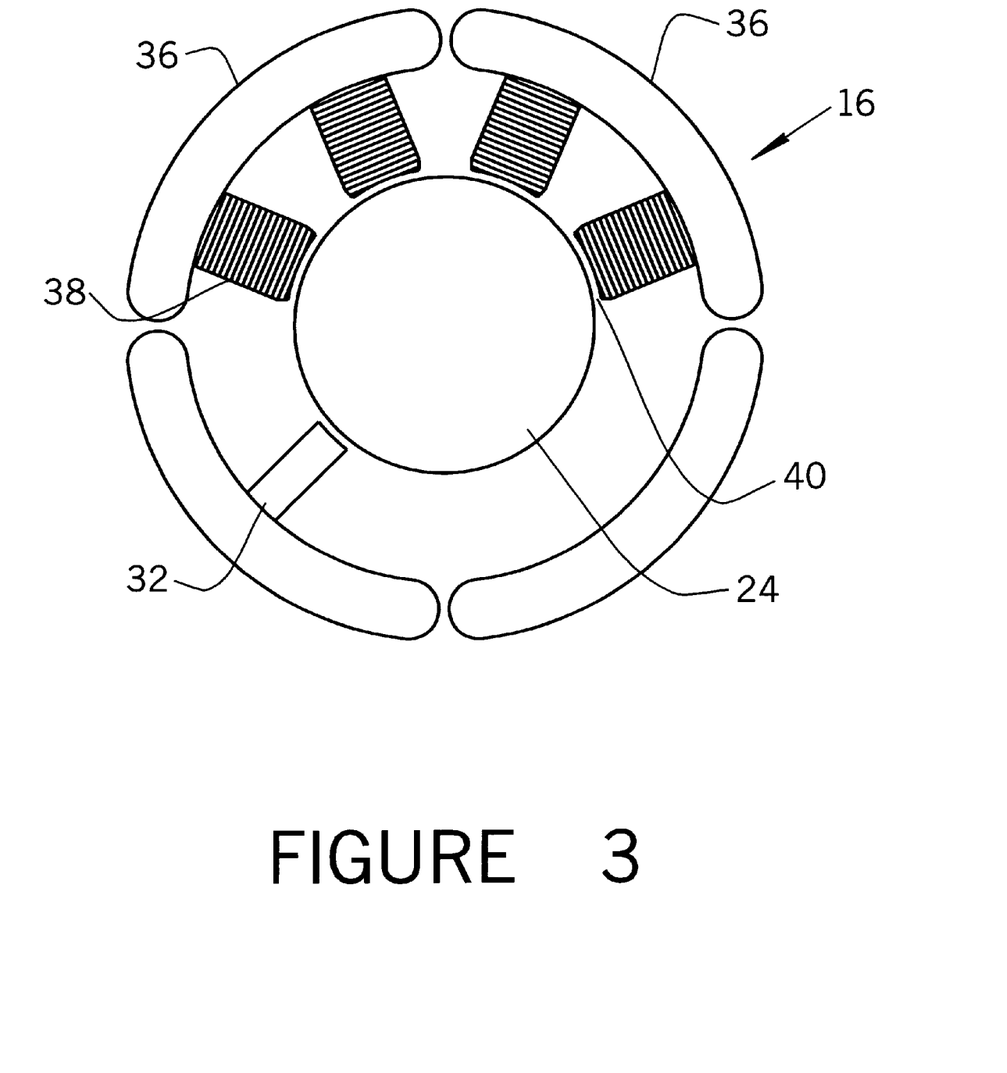
FIG. 3 is an plan view of a magnetic actuator useful in the present invention.

Each actuator 16,18 has a stator and sensor system. FIG. 3 is an elevational view of the operational part of magnetic actuator 16. Shown are two stators 36 and one sensor 32 arranged radially around a center. Additional stators and sensors could be present in each actuator. Each stator 36 includes a stack of lamination rings 38. Mandrel 24 is disposed on the center, below the lamination stacks and above the sensor. In operation the mandrel is levitated by the attraction between the mandrel and stators, but does not touch the stators due to feedback offered by the sensor. In this way, a gap 40 is maintained between the mandrel and the stators. As described more fully below, it is through this gap that the threadlines may be withdrawn. The size (width) of gap 40 is an important parameter that should be monitored and controlled. The gap must be wide enough to permit the material (threadline) to pass through it without contact or friction, but narrow enough to permit good control of the levitation. Currently, the preferred gap width for offwinding of threadlines is about 1 mm.

Figure 4:
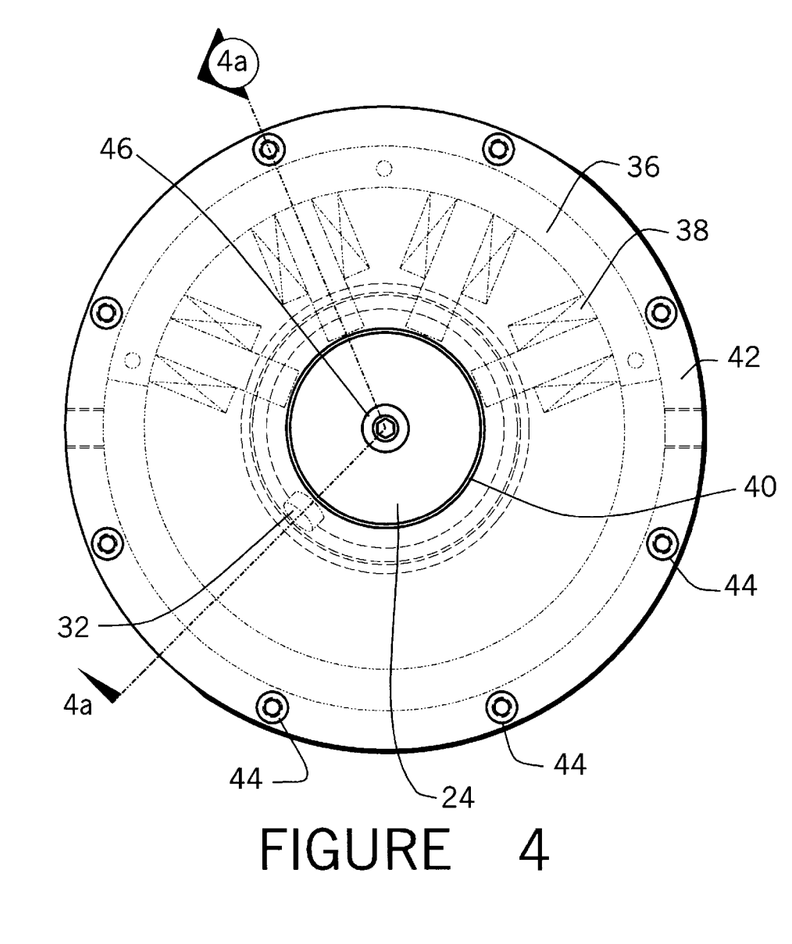
FIG. 4 is an elevational view of a magnetic actuator with cover in place and the components shown in phantom.

FIG. 4 illustrates magnetic actuator 16 in elevation with shield 42 (or casing) in place. The components: sensor 32, lamination rings 38 and stators 36, are shown in phantom. Bolt holes 44 are shown for receiving bolts (not shown) to fasten the functional portions of the actuator to shield 42. Mandrel 24 is shown disposed in the center of the actuator and gap 40 is further illustrated. Bolt 46 is shown in FIG. 4, but is better illustrated in FIG. 4a.

Figure 4A:
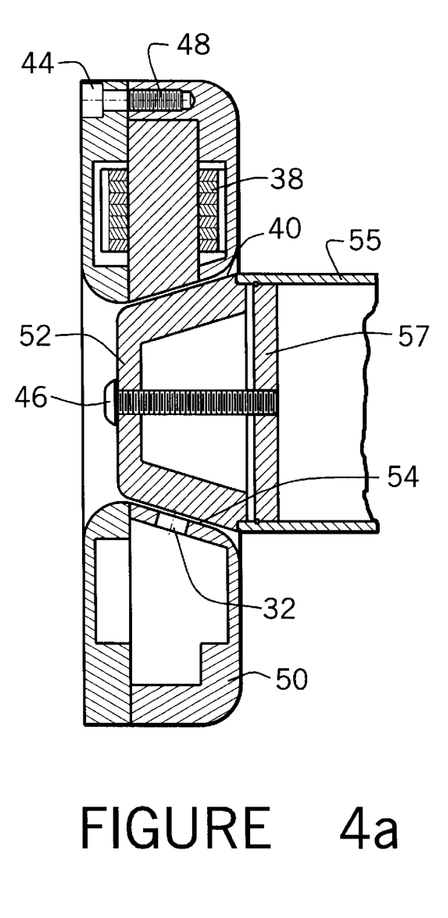

FIG. 4a is a cross-sectional view of FIG. 4, taken along lines 4a–4a and looking in the direction of the arrows. Shown is shield 42 with bolt holes 44 which mate with bolt holes 48 in the actuator assembly 50. Sensor 32 monitors gap 40 to ensure that the appropriate degree of levitation is maintained (during use). When the unit is not in operation, i.e., no magnetic field is induced by current through windings (lamination rings) 38, then mandrel cap 52 rests on surface 54 of the actuator assembly. Bolt 46 fastens mandrel cap 52 to plate 57 disposed within mandrel cylinder 55.

Mandrel cap 52 is composed of ferromagnetic material while mandrel cylinder 55 is non-magnetic. Thus, when a magnetic field is generated by current passing through lamination stacks 38, mandrel cap 52 is controllably attracted to the stators 36 (FIG. 3), and accordingly levitated within gap 40. Mandrel cylinder is made of a non-ferromagnetic material (such as aluminum) so that it is not attracted to the actuators.

Figure 5:
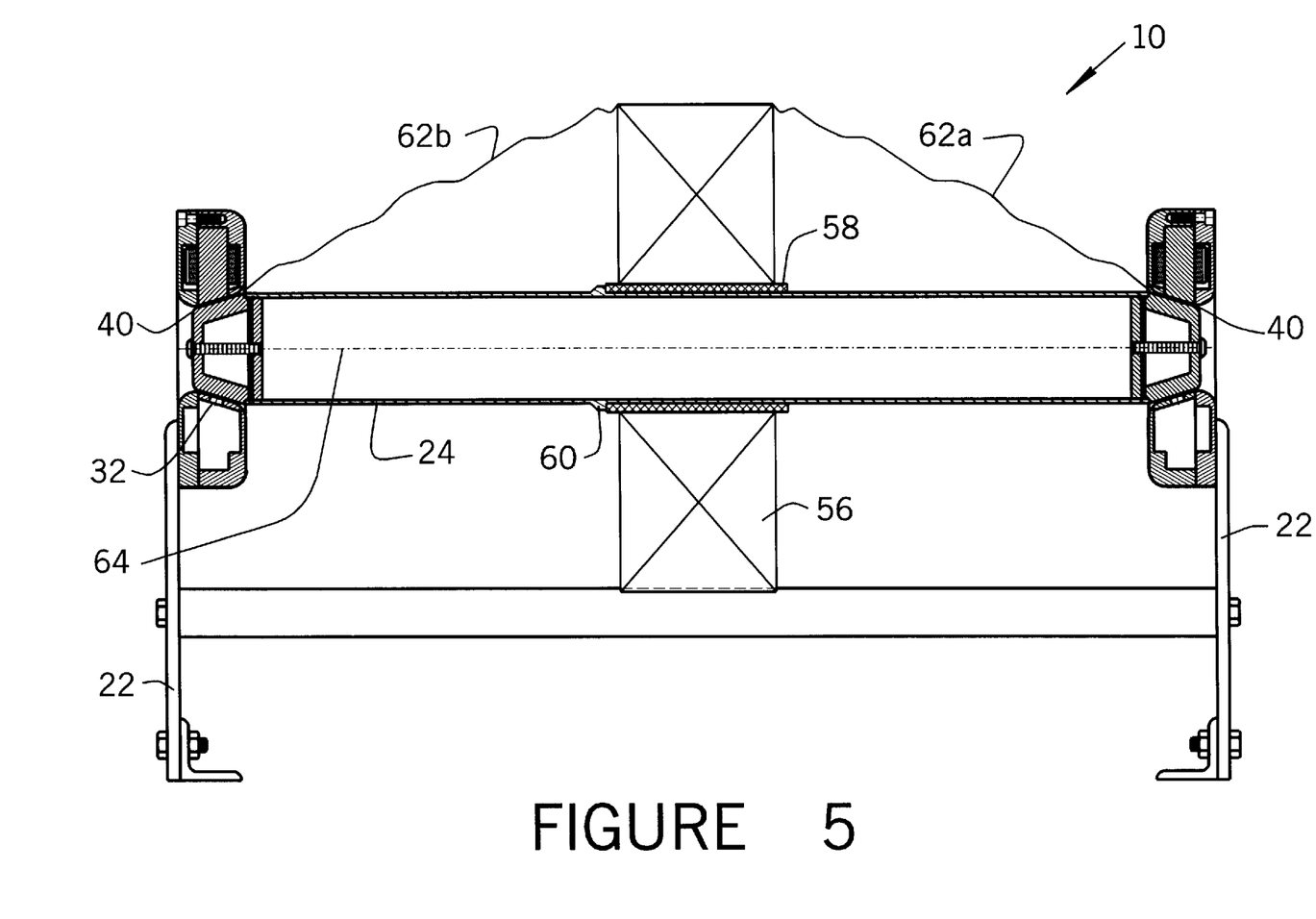
FIG. 5 is a side, elevational cross-section of the apparatus of the present invention.

FIG. 5 is an elevational view, taken in partial cross-section of the support assembly 10. Package 56 (supported on tube 58) is shown in position on mandrel 24. The package 56 can be easily placed and replaced by partially sliding the mandrel to either the left (in the plane of the figure) and placing the package on the mandrel cylinder, then sliding the mandrel back into position. Other methods may also be used as is convenient and apparent to those of ordinary skill in this art.

It is important that the package weight be distributed approximately evenly from side to side so that, when levitated, mandrel 24 will be fairly level. Although the side-to-side orientation of the package can be established in several ways, one way is show in FIG. 5. A balanced position of the package is ensured by package stop 60 which is formed into mandrel 24 based on the type of package and its characteristics (e.g., width). (Clearly, if the width of the package is changed then the position of stop 60 will have to change, too. This can be accomplished, for example, by having several interchangeable mandrel cylinders available for selection based on package width.)

Two threadlines, 62a,b are shown being off-wound from the package generally parallel to the centerline 64 of mandrel 24.

It should be apparent that as the package size diminishes, the direction of off-winding will approach being exactly parallel to the centerline. Moreover, it will be understood that, after each threadline passes through respective gaps 40, the threadline may advance in nearly any direction, such as to a warping (or other) machine positioned beyond the plane of the drawing. Appropriately positioned guides will accomplish this.

It was not considered necessary to present lengthy and detailed derivations and theory here. However, it will be recognized that the strength of the magnetic field generated by the actuators is important and depends on the weight to be levitated. In general, the total weight to be levitated (package plus mandrel) is borne equally by each actuator present. Thus, if the total weight to be levitated is 70 pounds (32 kg) and there are two actuators, each actuator bears about 35 pounds (16 kg). For the sake of reference, if the total load is 50 lb (23 kg), then the number of windings (i.e., lamination rings 38 (FIG. 3)) necessary per pole in the four pole design illustrated is 458 when the design current is 1 amp. The coil area and length is also important to levitation performance. The following specifications are useful for a system designed to levitate up to 70 pounds (32 kg) (total weight):

| Actuator Geometry: | | | |
|---|---|---|---|
| Stack (winding) length | | 0.75 in | (19.05 mm) |
| Stator outer diameter | | 8.6 in | (218.4 mm) |
| Stator inner diameter | | 3.5 in | (88.9 mm) |
| Rotor outer diameter | | 3.4 in | (86.4 mm) |
| Pole width | | 0.88 in | (22.22 mm) |
| Material Properties: | | | |
| Material grade: | Stator | AISI 1018 | |
| | Rotor | M19 | |
| Saturation flux density | | 1 Tesla | |
| Relative Permeability | | 3000 | |
| Lamination Thickness | Stator | solid | |
| | Rotor | 0.014 in | (0.36 mm) |
| Material resistivity | | 18.9 μΩ-in | (48.0 μΩ-cm) |
| Stacking factor | | 96 | |
| Coil Specifications: | | | |
| Wire gauge | | 23 AWG | (1.9 mm) |
| Wire type | | Hyslik 200 heavy/round | |
| Coil insulation | | 0.014 in | |
| Turns per Coil | | 660 | |
| Coil Extension | | 0.24 in | (6.1 mm) |
| Quadrant Resistance (calculated) | | 5.36 Ω | |
| Quadrant Inductance | | 20 mH | |

A system designed with these specifications will be able to levitate a range of package weights depending upon the current provided. It will be understood that the materials and strength of the magnetic field can be adjusted through material selection and current flow to support packages that are fundamentally heavier or lighter.

Another aspect of the present invention is a process for off-winding materials. In carrying out this process, the apparatus described above is advantageously put to use. The process involves magnetically levitating a package about a centerline (such as the mandrel core) such that the package remains relatively free from rotation during the off-winding of the material (thread). Thus, the package does not need to be mechanically braked. Sufficient "braking" occurs when the current flow stops, causing the magnetic field to extinguish and the mandrel to rest on the actuator.

Supporting the package without physical contact to the support (e.g., mandrel 24) allows two threadlines to be unwound from the package without the threadlines twisting around each other. The rotational twist which would occur if the package was unwound from one side is prevented because the package is unwound from two sides. This means that the thread is taken from the package without causing, or needing to cause, rotation of the package about the centerline. According to the process of the invention, this is accomplished by removing the material (each threadline) in opposite directions that are approximately parallel to the centerline. Although the material is not strictly parallel, it is removed approximately along the axis of the centerline rather than tangentially to it.

Off-winding speeds of, for example, 2500 m/min are possible, but there is not deemed to be any real limitation placed on offwinding speed by the apparatus of the present invention.

What is claimed is:

1. A process for off-winding at least two threadlines comprised of synthetic fiber from a package comprising the steps of:

(a) magnetically levitating the package about a centerline, such that the package remains relatively free from rotation; and (b) removing the material from the package in a direction that is approximately parallel to the centerline, wherein each threadline is removed in a direction approximately 180° from the other threadline.

2. The process of claim 1 wherein said magnetically levitating is accomplished using two radial magnetic actuators which are disposed one near either end of a support member which is holding said package.

3. The process of claim 2 wherein said magnetically levitating includes the step of:

(1a) applying an electrical current to said radial magnetic actuators thereby producing a magnetic field which levitates said support member within a central orifice formed in each said radial magnetic actuator.

4. The process of claim 3 wherein said removing is through a gap maintained between said actuators and said support member.

5. An apparatus for supporting materials to be off-wound, comprising:

a support member for receiving the material to be off-wound and having a circumference and an axis;

two radial magnetic actuators disposed one near either end of said support member;

a dentral orifice formed in each said radial magnetic actuator for receiving said end of said support member and having a circumference that is greater than the circumference of said support member; and a gap between said support member and each said radial magnetic actuator due to the difference between the circumference of the support member and the circumference of a radial magnetic actuator such that when a current to applied to said radial magnetic actuators, said support member is levitated within said gap and said materials to be off wound are withdrawn through the gap in a direction which approaches being parallel to said axis.

6. The apparatus of claim 5 wherein said gap is about 1 mm wide.

* * * * *

UNITED STATES PATENT AND TRADEMARK OFFICE
CERTIFICATE OF CORRECTION

PATENT NO. : 6,010,092
DATED : January 4, 2000
INVENTOR(S) : Holzer, Jr. et al.

It is certified that error appears in the above-indentified patent and that said Letters Patent is hereby corrected as shown below:

At column 8, line 7, please delete "dentral" and replace it with ---central---.

Signed and Sealed this

Twenty-eighth Day of November, 2000

Attest:

Q. TODD DICKINSON

Attesting Officer

Director of Patents and Trademarks